July 3, 1951  E. G. JUDD  2,559,441
ROTARY DRUM REACTOR
Filed May 4, 1946
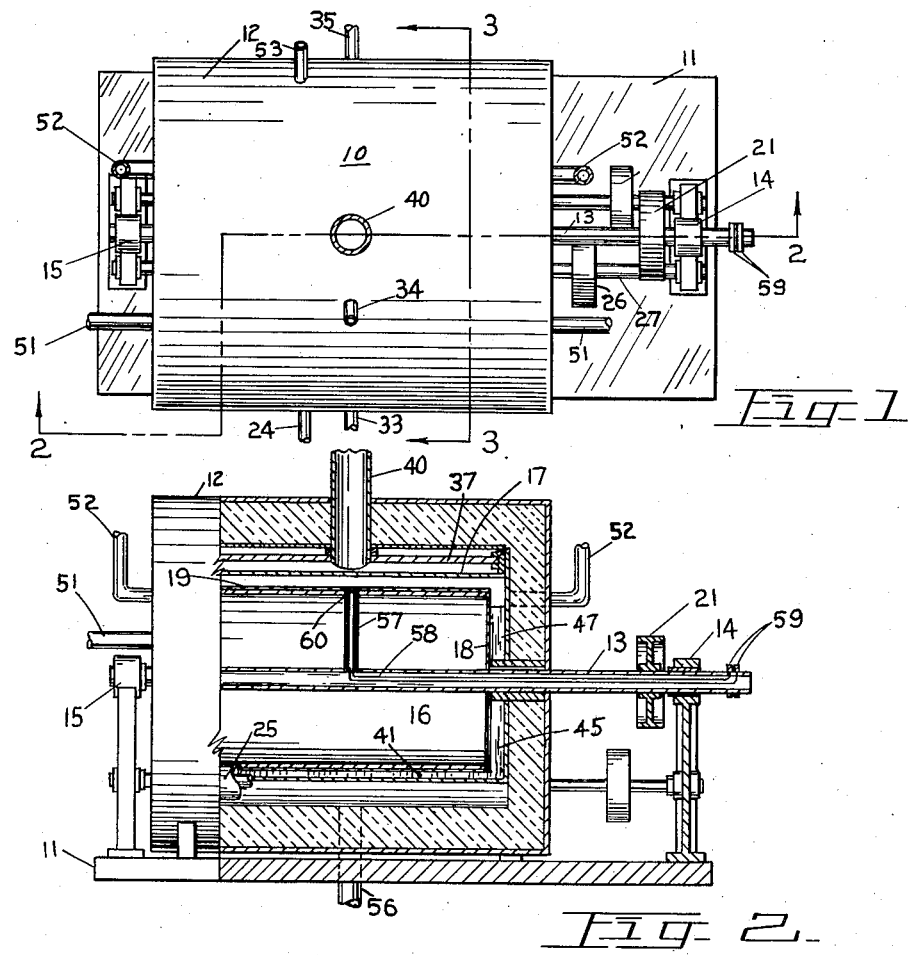
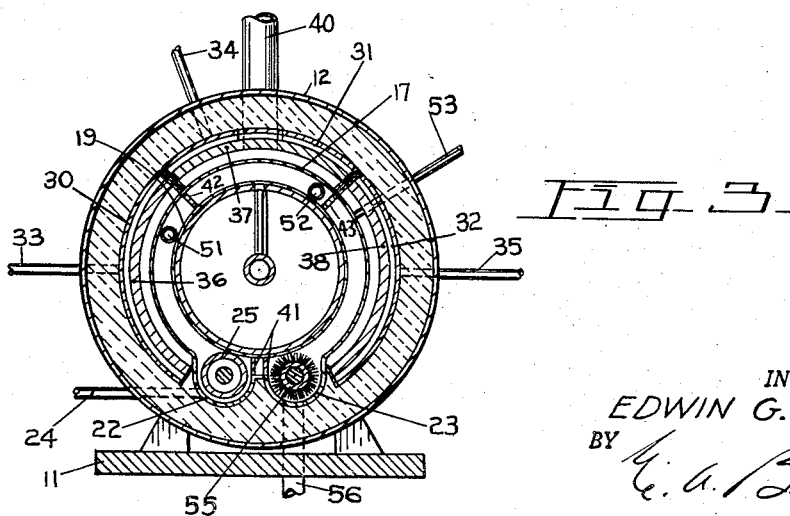
INVENTOR.
EDWIN G. JUDD
BY
ATTORNEY Patented July 3, 1951

2,559,441

UNITED STATES PATENT OFFICE 2,559,441

ROTARY DRUM REACTOR

Edwin G. Judd, Vancouver, Wash.

Application May 4, 1946, Serial No. 667,335

8 Claims. (Cl. 23—286)

The present invention relates to a dehydrating process and apparatus therefor and is more particularly concerned with the removal of the water and other volatilizable components from masses containing dissolved or suspended solid materials.

Various solutions and colloidal suspensions are known which require special treatment for the purpose of evaporating the liquid components thereof to obtain the desired solid residue. For example, in the dehydration of solutions of certain salts, such as aluminum salts, a stage is reached just prior to the point where the final traces of uncombined moisture are driven off where the residual mass becomes very thick and glutinous. At this stage of dehydration the material becomes an intumescent mass filled with constantly increasing fine bubbles which frequently cause the mass to become so voluminous as to overflow the container. As dehydration is continued the intumescent mass hardens on the surface so that it is practically impossible to remove the final traces of moisture, particularly combined moisture from the interior of the mass. It is therefore an object of the present invention to provide a new and improved dehydrating apparatus particularly adapted for the dehydration of materials which tend to cake or harden as the final traces of moisture are removed therefrom.

While not restricted thereto the present invention is generally concerned with the evaporation of an aqueous component of a solution containing dissolved aluminum chloride alone or in combination with acids or with other salts, particularly hydrochloric acid and/or metal chlorides, such as ferrous chloride. The process and apparatus of the present invention have been specifically designed for use in connection with the recovery of iron and aluminum from minerals containing these metals by treatment of the finely divided minerals with hydrochloric acid. As a result of such acid treatment there can be obtained an acid solution of iron chloride, aluminum chloride and other chlorides that might be mixed together or in chemical combination. Upon evaporating these solutions the residue, due to the presence of the aluminum compounds, becomes thick and intumescent so that the removal of the final traces of combined and uncombined water is rendered extremely difficult particularly for masses of substantial thickness. An additional object of the present invention, therefore, is to provide a process and apparatus for dehydrating such mixtures of chlorides in such a way that the water content in the form of moisture and the free hydrochloric acid can be driven off together from relatively thin films of the material, provision also being made for the subsequent removal of some or all of the iron content in the form of a ferric chloride sublimate. The process will be particularly described with reference to a preferred apparatus for use in carrying out the process.

In accordance with the illustrated embodiment, the apparatus comprises a hollow drum adapted to be rotated in a horizontal position within a cylindrical housing enclosing the drum with the inner wall of the housing spaced from the cylindrical surface of the drum. Means for heating the surface of the drum are operatively positioned within the housing behind the inner wall thereof. A plurality of partitions which extend longitudinally and are secured to the inner wall, and which extend inwardly therefrom, serve to divide the space between the housing wall and the surface of the drum into a plurality of chambers or compartments. The inner edges of these partitions are preferably flexible and are adapted to press lightly against the surface of the drum so that in cooperation with means for sealing the ends of the compartments, each compartment is substantially air tight under the conditions of operation of the device. In the illustrated modification the ends of the compartments are sealed by extending the opposite edges of the partitions radially along the ends of the housing. Means for applying the fluid material to the surface of the drum include a trough extending longitudinally of the apparatus below the drum and an applicator within the trough in operative contact with the surface of the drum. As the drum rotates the coating of fluid material is carried through the various compartments where it is first dehydrated and, if desired, thereafter further heat-treated as for the purpose of removing sublimable solid constituents thereof. Conduit means are arranged for removing the volatile ingredients of the coating from the various compartments or for introducing air or other gas as required. The dry and heat-treated product is removed from the surface of the drum by means of a scraper or the like arranged below the drum ahead of the applicator.

Additional features of the invention will become apparent from the following description with reference to the accompanying drawing in which Fig. 1 is a plan view of the dehydrating apparatus of the present invention; Fig. 2 is an elevational view, partly in cross section, taken along line 2—2 of Fig. 1; and Fig. 3 is a cross sectional view taken along line 3—3 of Fig. 1.

Referring to the drawing, the dehydrating apparatus of the invention will now be specifically described in connection with the dehydration and heat-treatment of a solution of iron and aluminum chlorides, some or all of the iron content of which is in the ferrous state. The apparatus illustrated comprises a housing 10 which is somewhat circular in shape and which is supported on a base 11. The housing preferably comprises an outer wall 12 and an inner wall 17, the space between the walls being packed with suitable insulating material. Suspended on a hollow shaft 13 extending longitudinally through the housing and supported at its ends by bearings 14 and 15 is a hollow round drum 16. The drum is completely enclosed by the inner wall 17 of the housing, the inner wall 17 being substantially cylindrical in shape and being spaced a short distance from the surface of the drum.

The drum 16 comprises a supporting framework including solid end portions 18 and is preferably surfaced with a thin sheet of acid resistant steel 19 extending over the entire cylindrical surface thereof. A pulley 21 fixed to the hollow shaft 13 provides means for rotating the drum 16 within the housing.

Arranged below the drum and extending longitudinally of the housing are two troughs or channel-shaped portions 22 and 23 which may be formed integral with the inner wall 17 of the housing. The solution to be dehydrated is fed through a pipe 24 into trough 22 and is applied to the surface of the revolving drum by means of revolving applicator 25 positioned within the trough and extending the entire length of the drum 16 in contact with the surface of the drum. The applicator may be revolved by frictional engagement with the surface of the drum or may be separately driven by means of a pulley 26 secured to the shaft 27 on which the applicator is mounted.

Means for heating the material applied to the drum surface by applicator 25 comprises a plurality of heating units 30, 31 and 32 positioned behind the inner wall 17 of the housing. In the illustrated embodiment gas fired units are employed, these units comprising hollow body members having non-porous convex back portions and concave front portions including porous plates 36, 37 and 38 of a material such as Alundum through which the gas-air mixture fed to the respective burners through pipes 33, 34 and 35 will pass to be ignited on the outer surface of the respective plates, producing a thin incandescent surface characterized by very little flame but furnishing ample radiant heat for heating the inner cylindrical wall portion 17 of the housing to the desired temperature. The gaseous products of combustion are conducted out of the apparatus through vent 40. It will be understood of course that the invention is not limited to any particular heating means. For example, electrical resistance units can be substituted for the gas plates.

The space between the inner wall 17 of the housing and the surface of the revolving drum 16 is divided into a plurality of compartments running the entire length of the drum by means of a series of partitions 41, 42 and 43 which are attached to the wall 17 and which extend radially inwardly therefrom. Each of these partitions is provided with flexible forward edge portions made for example from asbestos sheeting, these edge portions being arranged to just touch the revolving surface of the drum 16 without pressing sufficiently against it to dislodge the adhering film of residue thereon. It will be noted also that the various partitions are so arranged that each of the compartments is heated by a separate heating unit so that if desired the portions of the inner wall 17 forming part of each of these compartments can each be maintained at different temperatures.

By extending the ends of the partitions 41, 42, and 43 inwardly along the inner faces of the inner end walls 46 of the housing to the shaft 18 as indicated at 45 and 47 for partitions 41 and 43, the ends of the various compartments are also effectively sealed and separated one from another to prevent the escape or entrance of fumes from or into the various compartments.

Conduit means are provided for each of the compartments for removing the volatile components of the solution or for introducing air or other gas into the compartments.

As the drum revolves the solution of iron and aluminum chlorides applied to the surface thereof by applicator 25 is brought to a position opposite the portion of the inner wall 17 heated by means of heating plate 30 and is heated to a temperature sufficient to drive off the uncombined water and any hydrochloric acid present in the solution. These volatile components are removed from the compartment through conduit 51. The speed of the revolving drum and the degree of heat required are together so regulated as to complete this stage of dehydration while the surface of the drum to which the film adheres moves from the applicator 22 to the partition 42. As much of the iron in the above-mentioned solution is in the ferrous state and as the water and hydrochloric acid have been removed in the first compartment from which air has been extracted, the film of solid material passing beneath partition 42 will be composed substantially of ferrous chloride and hydrated aluminum chloride having the formula $AlCl_3 \cdot 6H_2O$. As the three divisions of the heating surface, that is, of inner wall 17, surrounding the drum are heated with three separate heating units, different temperatures can be maintained in the three compartments, and in the second compartment heated by unit 31 the temperature can be raised to approximately 300° C. Under these conditions in the absence of air or other external sources of oxygen, the ferrous iron has a greater affinity for chlorine than does the aluminum chloride while the aluminum has the greater affinity for the water in combination with the chlorine so that a part of the chlorine will be transferred from the aluminum to the iron raising the latter to the ferric state and converting the aluminum to its hydroxide. The ferric chloride sublimes at about 300° C. and is removed as vapor through conduits 52. If for any reason there should not be enough chlorine secured from the aluminum chloride to sublime all of the iron, means also can be provided for introducing dry hydrogen chloride or chlorine into this compartment.

The aluminum which at about 300° C. still holds sufficient water to be in the form of a hydroxide remains on the surface of the revolving drum 16 and passes beneath partition 43 into the third compartment heated by unit 32 to a temperature of approximately 470° C. Any particles of iron still remaining in the film in the ferrous state are raised to the ferric state at this higher temperature particularly in the presence of air admitted to this compartment through inlet 53. The aluminum hydroxide and any ferric iron is then removed from the surface of the revolving drum by a revolving extractor brush 55 in trough 23, the extractor brush 55 running the entire length of the drum. The finely divided material removed by brush 55 can be drawn off from the apparatus by means of a slight vacuum applied to the outlet pipe 56 connected to the bottom portion of trough 23.

The temperatures of the three heating compartments surrounding the revolving drum through which the film passes while adhering to the drum surface can be checked by means of pyrometer points 60 located in the pyrometer well 57 secured to the hollow shaft 13 and extending radially therefrom with the outer end thereof in contact with the inner surface of the sheet 19. The leads 58 from the pyrometer are brought out through the hollow shaft 13 to a pair of slip rings 59 which in turn can be connected to a pyrometer dial (not shown). As the thin metal covering 19 is subjected to the action of acid or acid vapors and to the scraping action of brush 55, it can be replaced as required.

From the above it will be seen that there has been provided by the present invention apparatus for efficiently and effectively dehydrating and otherwise heat-treating any fluid material, and particularly for heat-treating mixtures of ferrous chloride and aluminum chloride for the purpose of lowering the iron content thereof.

Having described the invention in what are considered to be certain preferred embodiments thereof, it is desired that it be understood that the specific details shown and described herein are merely illustrative and that this invention may be carried out by other means.

What I claim is:

1. An apparatus for processing a volatile material consisting of volatile and solid nonvolatile components comprising a horizontal cylindrical member adapted to be rotated about its longitudinal axis, a housing for said member having a heatable cylindrical wall portion spaced from the surface of said cylindrical member, a plurality of spaced longitudinal partitions secured to said cylindrical wall portion and extending radially inwardly with their inner ends substantially contacting the surface of said cylindrical member, said partitions dividing the space between said cylindrical member and said housing into a plurality of chambers, means in one of said chambers for applying fluid material to the surface of said cylindrical member, and means positioned in another of said chambers for removing the non-volatile material from the surface of said cylindrical member.

2. An apparatus for processing a fluid mixture including volatile liquid and solid components comprising an elongated horizontal drum, means connected to said drum for rotating the same about its longitudinal axis, a housing for said drum having an inner cylindrical wall portion spaced from the surface of said drum, a plurality of circumferentially spaced apart partition means extending longitudinally of said cylindrical wall portion and projecting radially inwardly toward said drum substantially to divide the space between said drum and said cylindrical wall portion into a plurality of chambers, heating means mounted within said housing adjacent said wall portion and on the opposite side thereof with respect to said drum for heating the cylindrical wall portion, applicator means in one of said chambers adapted to apply a layer of fluid mixture to the surface of said drum, conduit means connected to a second of said chambers for removing a volatile component of said fluid mixture, and contact means provided in a third chamber for removing the solid residue from the surface of said drum.

3. An apparatus for dehydrating a solution of iron and aluminum chlorides and for volatilizing a substantial portion of the iron chloride content of said solution, said apparatus comprising an elongate horizontal drum, means connected to said drum for rotating the same about its longitudinal axis, a housing for said drum including an interior cylindrical wall portion spaced from the cylindrical surface of said drum, means mounted within said housing and on the opposite side of said cylindrical wall portion with respect to said drum for heating said wall portion, elongate partition means secured to said cylindrical wall portion extending in the axial direction of said drum and projecting from said wall portion toward said drum for dividing the space between said drum and said cylindrical wall portion into a plurality of elongate compartments extending in the axial direction of said drum, an applicator in one of said compartments for applying a film of said solution to the surface of said drum, a conduit communicating with said one compartment for removing a first volatilized component of said solution from said one compartment, conduit means communicating with a compartment next adjacent said one compartment for removing a second volatilized component of said solution therefrom, and means provided in a third compartment for removing residual solid material from the surface of said drum.

4. An apparatus for dehydrating a solution of iron and aluminum chlorides and for volatilizing a substantial portion of the iron chloride content of the product, said apparatus comprising an elongate horizontal drum, means supporting said drum for rotation about its axis, a housing for said drum including an interior cylindrical wall portion concentric with said drum and spaced from the cylindrical surface of said drum, heating means mounted within said housing adjacent said cylindrical wall portion on the opposite side thereof with respect to said drum, elongate partition means secured to said cylindrical wall portion extending longitudinally of said drum and projecting inwardly toward said drum, the inner edge of said partitions extending closely adjacent and parallel with the surface of said drum, said partition means dividing the space between said cylindrical wall portion and said drum into a plurality of longitudinally extending compartments, an applicator in one of said compartments for applying a film of said solution to the surface of said drum, a conduit communicating with said one compartment and removing therefrom a first volatilized component of said solution, conduit means communicating with a next adjacent compartment in the direction of rotation of said drum for removing from said last mentioned compartment of second volatilized component of said solution, contact means provided in a third compartment in the direction of rotation of said drum for removing residual solid material from the surface of said drum, and conduit means communicating with said third compartment for supplying gas thereto.

5. An apparatus for separating a solution into its volatile and solid components comprising an elongate horizontal drum having closed ends, means supporting said drum for rotation about its axis, a housing enclosing said drum including an inner wall, said inner wall comprising a pair of longitudinally extending parallel troughs positioned below said drum and a cylindrical wall portion extending between said troughs over the upper part of said drum, said cylindrical wall portion being concentric with and spaced from said drum, a plurality of longitudinal partitions on said cylindrical wall portion extending radially inwardly toward said drum to divide the space between said cylindrical wall portion and said drum into a plurality of compartments, independent heating means aranged adjacent said cylindrical wall portion on the opposite side thereof with respect to said drum and adjacent each of said compartments, a liquid solution inlet conduit communicating with one of said troughs, an applicator in said one trough for depositing a film of said solution on to the surface of said drum, contact means arranged in the other of said troughs for removing the solid residue from the surface of said drum, said drum being adapted to be rotated in such a direction whereby the film deposited by said applicator is carried upwardly through successive ones of said compartments before reaching said contact means, and independent conduit means communicating with certain of said compartments for removing volatile components of said solution therefrom.

6. An apparatus for processing a fluid material consisting of volatile and nonvolatile components comprising an elongate horizontal drum, means for supporting said drum for rotation about its axis, a housing for said drum including an interior wall portion spaced from the surface of said drum, a pair of radially spaced apart partitions extending longitudinally of said drum mounted on said interior wall portion and projecting inwardly toward the surface of said drum, the inner edges of said partitions extending parallel with and closely adjacent the surface of said drum dividing the space between said drum and said interior wall into a pair of compartments, an applicator means mounted in one of said compartments for applying a film of fluid material onto the surface of said drum, contact means arranged in the other of said compartments for removing nonvolatile components from said drum, independent heating means arranged within said housing on the opposite side of said interior wall with respect to said drum and adjacent each of said compartments for independently heating said compartments to selective temperatures.

7. An apparatus for processing a fluid material consisting of volatile and nonvolatile components comprising an elongate horizontal drum, means for supporting said drum for rotation about its axis, a housing for said drum including an interior wall portion spaced from the surface of said drum, a pair of radially spaced apart partitions extending longitudinally of said drum mounted on said interior wall portion and projecting inwardly toward the surface of said drum, the inner edges of said partitions extending parallel with and closely adjacent the surface of said drum dividing the space between said drum and said interior wall into a pair of compartments, an applicator means mounted in one of said compartments for applying a film of fluid material onto the surface of said drum, contact means arranged in the other of said compartments for removing nonvolatile components from said drum, heating means arranged within said housing adjacent each of said compartments for heating said compartments to selective different temperatures, and conduit means communicating with one of said compartments for removing therefrom a volatilized component of said fluid material.

8. An apparatus for processing a fluid material consisting of volatile and nonvolatile components comprising an elongate horizontal drum, means for supporting said drum for rotation about its axis, a housing for said drum including an interior wall portion spaced from the surface of said drum, a pair of radially spaced apart partitions extending longitudinally of said drum mounted on said interior wall portion and projecting inwardly toward the surface of said drum, the inner edges of said partitions extending parallel with and closely adjacent the surface of said drum dividing the space between said drum and said interior wall into a pair of compartments, an applicator means mounted in one of said compartments for applying a film of fluid material onto the surface of said drum, contact means arranged in the other of said compartments for removing nonvolatile components from said drum, heating means arranged within said housing adjacent each of said compartments for heating said compartments to selective different temperatures, conduit means communicating with one of said compartments for removing therefrom a volatilized component of said fluid material, and conduit means communicating with the other of said compartments for supplying gas thereto.

EDWIN G. JUDD.

REFERENCES CITED

The following references are of record in the file of this patent:

UNITED STATES PATENTS

| Number | Name | Date |
|---|---|---|
| 240,652 | Bruce et al. | Apr. 16, 1881 |
| 654,470 | Mather | July 24, 1900 |
| 888,839 | McGhie | May 26, 1908 |
| 1,200,117 | Johnson | Oct. 3, 1916 |
| 1,203,983 | Contant | Nov. 7, 1916 |
| 1,284,488 | Steward | Nov. 12, 1918 |
| 1,317,777 | Collis | Oct. 7, 1919 |
| 1,343,833 | Leitch | June 15, 1920 |
| 2,249,761 | Hixson | July 22, 1941 |

FOREIGN PATENTS

| Number | Country | Date |
|---|---|---|
| 175,015 | Germany | Sept. 22, 1906 |